United States Patent
Raguse

(10) Patent No.: US 7,219,452 B1
(45) Date of Patent: May 22, 2007

(54) TRENCH WHEEL APPARATUS AND METHOD OF USE

(76) Inventor: Steven F. Raguse, RR2 Box 24 County Rd. 16, Wheaton, MN (US) 56296

( * ) Notice: Subject to any disclaimer, the term of this patent is extended or adjusted under 35 U.S.C. 154(b) by 374 days.

(21) Appl. No.: 10/461,592

(22) Filed: Jun. 11, 2003

Related U.S. Application Data

(60) Provisional application No. 60/388,042, filed on Jun. 11, 2002.

(51) Int. Cl.
*E02F 5/08* (2006.01)

(52) U.S. Cl. ............................ 37/91; 37/347; 152/323; 301/5.303

(58) Field of Classification Search .................. 37/189, 37/462, 465, 352, 347, 91; 111/157, 158, 111/163, 139; 172/604, 599, 601, 518, 519; 152/323; 301/5.303, 5.301, 5.302, 44.1–44.4, 301/41.1
See application file for complete search history.

(56) References Cited

U.S. PATENT DOCUMENTS

| | | | | |
|---|---|---|---|---|
| D2,324 | S | | 5/1866 | Rank |
| 58,951 | A | * | 10/1866 | Moody ........................ 172/431 |
| 222,711 | A | * | 12/1879 | Lane ........................... 172/604 |
| 499,514 | A | | 6/1893 | Buchanan |
| 927,277 | A | * | 7/1909 | Peterson ...................... 172/604 |
| 1,477,915 | A | | 12/1923 | Seymour |
| 1,865,432 | A | * | 7/1932 | Bossert ...................... 152/379.3 |
| 1,866,797 | A | * | 7/1932 | Burdette ...................... 152/323 |
| 2,152,212 | A | | 3/1939 | Reinkens |
| 2,187,777 | A | * | 1/1940 | Gannett ...................... 301/64.304 |
| 2,240,994 | A | * | 5/1941 | Love ........................... 172/518 |
| 2,709,471 | A | * | 5/1955 | Smith et al. ................. 152/310 |
| 2,885,800 | A | | 5/1959 | Hawkins |
| 3,014,547 | A | | 12/1961 | Van Der Lely |
| 3,066,716 | A | * | 12/1962 | Fishman ...................... 152/323 |
| 3,397,933 | A | * | 8/1968 | Hatcher ....................... 384/460 |
| 4,039,265 | A | | 8/1977 | Dermond |
| 4,153,303 | A | * | 5/1979 | Tanner ................... 301/64.706 |
| 4,246,971 | A | * | 1/1981 | Johnson ....................... 172/535 |
| D296,106 | S | | 6/1988 | Stephens |
| 4,768,297 | A | | 9/1988 | Rivard |
| 5,156,218 | A | | 10/1992 | Metzler et al. |
| 5,242,214 | A | | 9/1993 | Granryd |
| 5,746,275 | A | * | 5/1998 | Cross et al. ................. 172/440 |
| 5,810,452 | A | * | 9/1998 | Hawthorne et al. ........... 301/43 |

(Continued)

OTHER PUBLICATIONS

"The Concise History of the Traction Engine", http://steam-up.co.uk/traction_engine_history.htm. Jun. 10, 2003, 2 pages, Threshers Bush Steam Club.

*Primary Examiner*—Victor Batson
(74) *Attorney, Agent, or Firm*—Albert W. Watkins

(57) ABSTRACT

A trench wheel has a relatively thicker wheel center and gradually tapering side walls that produce a thinner wheel as distance from the hub increases. The wheel center is preferably fabricated from stamped metal into a hat or thimble shape, and has a skirt or brim attached thereto which assists with the retention of an elastomeric outer wheel to the wheel center. Special adapter plates are illustrated which, in combination with the wheel center, permits mounting to both front and rear axles of all popular all-terrain vehicles. A method of controlling water in a field using the trench wheels on a vehicle includes cultivating, planting, and traversing the field to displace earthen matter and thereby channel the field.

10 Claims, 6 Drawing Sheets

U.S. PATENT DOCUMENTS 5,942,068 A * 8/1999 Adams et al. .............. 156/112
5,967,619 A   10/1999 Lochmiller
6,226,903 B1   5/2001 Erickson
6,298,891 B1 * 10/2001 Harris ........................ 152/382
6,336,280 B1   1/2002 Haigh

* cited by examiner

TRENCH WHEEL APPARATUS AND METHOD OF USE

CROSS REFERENCE TO RELATED APPLICATIONS

This application claims priority to U.S. provisional patent application Ser. No. 60/388,042 filed Jun. 11, 2002, the contents which are incorporated herein by reference in entirety.

BACKGROUND OF THE INVENTION

1. Field of the Invention

This invention pertains generally to land vehicle wheels, and more specifically to a wheel uniquely adapted for mounting on vehicles such as All-Terrain Vehicles (ATVs) or the like. In accord with the invention, the wheel is implemented in a method to beneficially control water within agricultural fields.

2. Description of the Related Art

The provision of basic necessities of mankind must be one of the fundamental cornerstones of all civilizations. Failure to adequately provide for citizens will rapidly lead to the downfall of any nation or republic. Among the basic necessities are food, water and shelter. As anyone familiar with the agricultural industry will confirm, the provision of food is all to frequently taken for granted and the technology believed to be simple. In fact, this industry is one which is highly automated and equipment intense, having evolved incredibly over the last one and one-half centuries.

In a modern North American farm, large tractors are most frequently used to cultivate the land and later plant seeds. Similar large equipment will be used after planting, both in the maintenance or cultivation of the crop and also in the harvesting. This equipment converts operations that are extremely labor-intensive into very efficient processes. Where a farmer using manual techniques, or even animal-drawn tools, may only be able to maintain a field of acreage numbering in the tens of acres, modern equipment permits farmers to farm thousands of acres. This automation of farming has resulted in a truly phenomenal reduction of labor.

Nevertheless, one of the challengers of modern agriculture is exactly the size of land under cultivation. In the event that there is a bumper crop and high market prices, the farmer will be rewarded well for his effort. Unfortunately, the opposite is also true. In the event of adverse weather or other vagaries of the environment, the farmer may be exposed to financial losses so severe that he is unable to continue with his very livelihood of farming. This problem is compounded by the substantial capital investment required for modern agriculture. The tractors, combines, and other machinery and attachments, buildings such as silos and barns, seed and soil additives and other numerous investments are all substantial. Yet, as with many industries, the automation is essential for most farmers to compete.

With such astounding benefit of automation, and consequent wide-spread implementation of farm machinery, much research and development focuses on new ways to use the equipment already in use by most farmers. Consequently, many agricultural equipment vendors have built upon the tractor as a platform for adding attachments and equipment. This use of the tractor is opportune, owing to the versatility inherent in the machine, and the prevalence upon modern farms. By adding attachments, the need for a complete separate machine is eliminated, thereby lowering the cost of the equipment and also reducing storage space required. Many attachments have been constructed. Nevertheless, these attachments tend to be relatively expensive, which only adds to the substantial capital investment and risk being taken by the farmer.

Among the many facets of modern agriculture, one area which has continued to be troublesome for farmers and to which the present invention is directed is that of moisture control. All plants require adequate moisture for sustained growth, but too much will drown the plants. Several steps are commonly taken to assist with the proper watering of plants. Among these are various above ground and underground irrigation systems, the introduction which is very expensive, but nevertheless justified for many arid regions of the continent. To assist with too much moisture, most farmers rely upon either intrinsic drainage of the soil and evaporation, or, in some cases, a gentle sloping of the field. Unfortunately, sloping will all too frequently lead to excess run-off during short, heavy rainfalls, often referred to as cloud bursts, which may be vital to adequate water supplies within the cultivated field. Evaporation is only helpful when there is sufficient time between rains to permit the soil to dry and aerate. As a result, while still often used, neither sloping nor evaporation yields desired predictable moisture levels.

Yet another approach to the water control, and one which is frequently used in wetter areas, is the provision of large drainage ditches that pass regularly through the land. These ditches provide clear pathways for the drainage of water into lower un-cultivated areas, ranging from holding ponds to rivers and streams. These larger ditches unfortunately require much expense during construction, undesirably block pathways through the fields, and reduce the acreage available for plants. Once these drainage ditches are formed, they are not practically removed. In other words, should the vagaries of the weather result in a drought, the ditches remain, so that even if there is a cloud burst, much of the moisture will be lost to these semi-permanent drainage ditches.

Exemplary of this approach of forming a ditch within a field is U.S. Pat. No. 2,885,800 to Hawkins, the teachings which are incorporated herein by reference, which illustrates an agricultural tractor driving a large wheel traveling at an angle offset to the direction of rotation of the wheel. As aforementioned, such ditches are semi-permanent, being both difficult to create and difficult to remove. Further, the machinery illustrated in the Hawkins patent is relatively expensive, adding undesirably to the capital investment required by the farmer. Another drawback with this type of machine is the need for soil sufficiently stable to permit the large and heavy machinery, such as a tractor or the like with associated attachment, to pass through the field and support the forces applied by the ditching attachment. As may be recognized, fields that are partially submerged may not be passable at all by such a machine. Without being able to get the machine through, the farmer must rely upon evaporation and soil drainage. If these are inadequate to dissipate moisture, then any crops or seeds may be destroyed, or the window for planting crop lost. Other similar trenching machines are illustrated by Dermond in U.S. Pat. No. 4,039,265; Rivard in U.S. Pat. No. 4,768,297; Erickson in U.S. Pat. No. 6,226,903; and Haigh in U.S. Pat. No. 6,336,280; the teachings of each which are also incorporated herein by reference.

As an alternative, U.S. Pat. No. 2,152,212 to Reinkens illustrates a modification to a tractor to provide five packed grooves or ditches in the ground in one pass of a tractor. The tractor attachments comprise various wheel replacements that provide a combination of smooth circular circumferences and circumferential protrusions that are designed to form small grooves centered within each wheel. Unfortunately, these types of wheels are very large and expensive, have little traction within a field, and are relatively difficult to exchange for more standard tractor tires. Furthermore, owing to the essentially continuous ground contact across the entire width of the tractor, such implement may only be used prior to the growth and development of a crop. In other words, the attachment is a useful tool for soil cultivation, but is destructive to crop after the germination of seeds within a field. In view of the substantial investment, difficult installation, poor traction, and limited useful period, the Reinkens machine has not gained commercial acceptance.

Wheels have been developed and refined through many iterations and come in many variations. While the Reinkens wheels described above are formed of circular metal which is relatively smooth along the ground contact surfaces, other wheels have been designed which are not so. One such wheel is illustrated in U.S. Pat. No. 499,514 to Buchanan, which illustrates a tapered metal wheel described for use on heavy vehicles such as traction engines. This wheel, manufactured from steel, offers the benefit of lighter weight and strong resistance to lateral and crushing strains. While such wheel may have been beneficial with the very large and heavy traction-engines, no indication of use on other vehicles or for other purpose was provided by Buchanan, nor recognized by artisans through the past century.

SUMMARY OF THE INVENTION

In a first manifestation, the invention is a trench wheel adaptable for use on a land vehicle. The wheel has an outer generally circumferential region of ground contact. A hub section is generally radially centered with respect to the outer generally circumferential region. Mounting points within the hub section are suitable for secured contact with the land vehicle. An outer wheel has first and second side walls that are spaced from each other by a first distance adjacent the hub section and by a second distance adjacent the outer generally circumferential region of ground contact. The first distance between side walls is greater than the second distance, and the mounting points are more nearly adjacent the first side wall than the second side wall.

In a second manifestation, the invention is, in combination, a land vehicle and at least two trench wheels. The land vehicle has at least two wheel hubs for supporting at least two trench wheels in axial alignment along an axis of forward travel. The two wheel hubs are displaced from alignment with each other and are instead aligned about an axis nonparallel to the axis of forward travel. The trench wheels have identical construction, being relatively narrow at an outer circumference and generally widening with decreasing radial distance from an axis of wheel rotation. The wheels have a mounting offset from the axis of forward travel which has a first mounting face and a second mounting face opposed to the first mounting face. A first one of the at least two trench wheels is mounted to a first one of the at least two wheel hubs with the first mounting face adjacent the first wheel hub, while the second one of the at least two trench wheels is mounted to a second one of the at least two wheel hubs with the second mounting face adjacent the second wheel hub.

In a third manifestation, the invention is a method for controlling water within a field. According to the method, a field is cultivated in preparation for planting of a crop. The crop is planted. At least one tire is removed from a land vehicle, and at least one trench wheel is attached thereto in lieu of the at least one tire. The trench wheel has a narrow outer circumference, and generally widens with decreasing radius, and amounting offset from an axis of forward travel. The mounting has a first mounting face and a second mounting face opposed to said first mounting face. With the new wheel in place, the field is traversed to displace earthen matter and thereby form channels within the field.

OBJECTS OF THE INVENTION

Exemplary embodiments of the present invention solve inadequacies of the prior art by providing wheels shaped to cut trenches in soil when used as replacements for the inflatable tires of an ATV, thus controlling water within a field.

A first object of the invention is to provide wheels which are adapted for specific use on ATVs or similar vehicles, and which will accommodate the many diverse hubs found therein. A second object of the invention is to provide a wheel center which accommodates both front and rear hub designs without requiring different wheels, thereby simplifying both manufacture and installation. Another object of the present invention is to provide a method for crop cultivation which allows plants growing within a field to be undisturbed by the method. A further object of the invention is to enable the formation of temporary irrigation and drainage ditches in a field relatively independently of the moisture content and soil type of the field. Yet another object of the present invention is to provide wheels which may be used for other diverse activity, while minimizing any drawbacks that might otherwise prevent such diverse usage. Another object of the invention is the formation of water channels without any associated ridges which might otherwise interfere with crop-related activities. A further object of the invention is to minimize crop damage when traversing a planted field.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
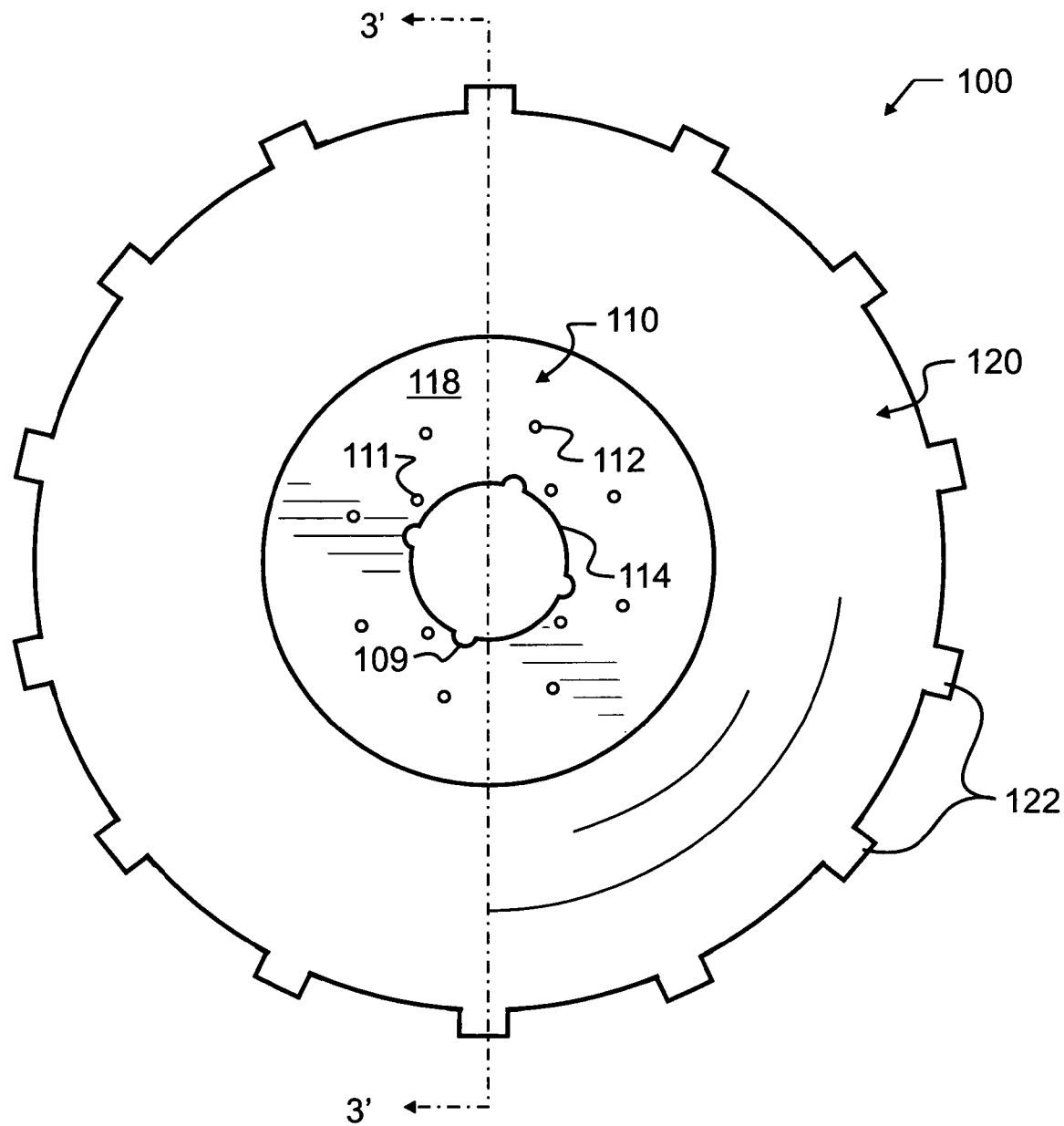
FIG. 1 illustrates a preferred embodiment wheel in accord with the teachings of the present invention from side plan view.
Figure 3:
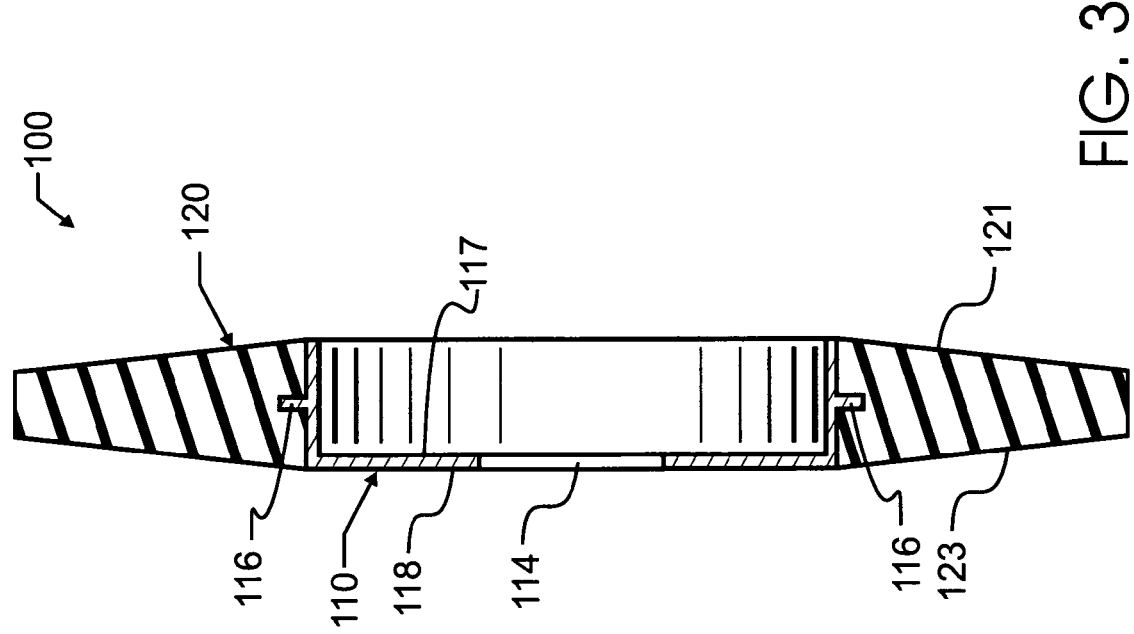
FIG. 3 illustrates the preferred embodiment wheel of FIG. 1 from cross-section view taken along line 3' of FIG. 1.

Manifested in the preferred embodiment trench wheel 100, the present invention provides a cylindrical wheel center 110 in the general shape of a top hat or thimble. Wheel center 110 is affixed on a circumference to an elastomeric outer wheel 120 having two slightly concave exterior faces 121, 123 that are spaced from each other by a maximum spacing adjacent wheel center 110 and which converge to a minimum spacing adjacent ground contacting knobs 122. The convergence will preferably be a gradual taper, and may be linear or even slightly concave or convex, though convex is slightly preferred for better characteristics of trenches formed using the wheel. First surface 123 of traction wheel 100 extends in this roughly convex shape wheel center 110 adjacent a first surface 118 thereof, where holes 112 are provided through which threaded studs pass. A central hole 114 that is typically much larger than holes 112 is provided through which a hub may pass, as is common in land vehicles. As is best visible from FIG. 3, an opposite side 117 of the hub section 110 from surface 118 has a larger opening that is recessed towards the center of the wheel, for reasons which will be described in greater detail herein below. Trench wheel 100 most preferably includes small cleats or lugs 122 provided around the outer circumference. These lugs 122 will most preferably be of geometry which is self-cleaning during use, which ensures that they will continue to function regardless of the soil condition. As shown, the wide spacing and complete avoidance of cracks or crevices in the lug configuration prevent earth or other materials from sticking to the lugs. In this most preferred combination, trench wheel 100 is preferably designed to have an outside diameter which is roughly equivalent to the outside diameter of the traditional wide rubber pneumatic tires which are conventionally used with ATVs. Consequently, the most preferred embodiment trench wheel 100 may be used as substitute or replacement wheel for existing tires.

While the materials used in the manufacture of trench wheel 100 are not critical, and may be varied as is known in the design of machinery and equipment, steel offers several advantages in the design of wheel center 110 that are most preferred. While cost and machinability are obvious advantages, the present invention will also have sufficient durability to withstand the forces induced during inevitable contact with rocks, roots, and other obstacles that may be encountered. In the manufacture of wheel center 110, wheel center 110 may be stamped, zinc plated, cleaned, and adhesive applied. The adhesive is designed to assist with the bonding of an elastomer such as carbon-filled rubber or the like to the steel of center 110. While steel may also be used to form the outer wheel 120, an elastomeric material is preferred. Since such elastomer will absorb impact during contact with obstacles, and will additionally provide a quieter, more comfortable running surface with better traction on most surfaces, elastomers such as tire rubbers, polymers and the like, and even composites such as foams or the so-called self-skinning foams, or other suitable materials are contemplated herein, though a carbon-filled natural rubber is most preferred. Owing to the geometry of the wheels, there is a substantial amount of strength intrinsic to the wheel. Nevertheless, this strength must be considered in the selection of materials. A small skirt 116 may be provided for increased surface area of contact and some nominal reinforcement when an elastomer is used for outer wheel 120.

Where more rigid materials are used for outer wheel 120, additional weight may be provided by the user, by adding sand, liquid or other material within the inside of the wheel. This may either be done at the time of manufacture, or more preferably through the incorporation of an access port within one of the sides 121, 123 or from wheel center 110. The trenching application is one such application where additional weight may be desired, depending, of course, upon the condition of the soil at the time. This allows the operator to increase the depth of trenches produced in the earth without making other change.

Figure 4:
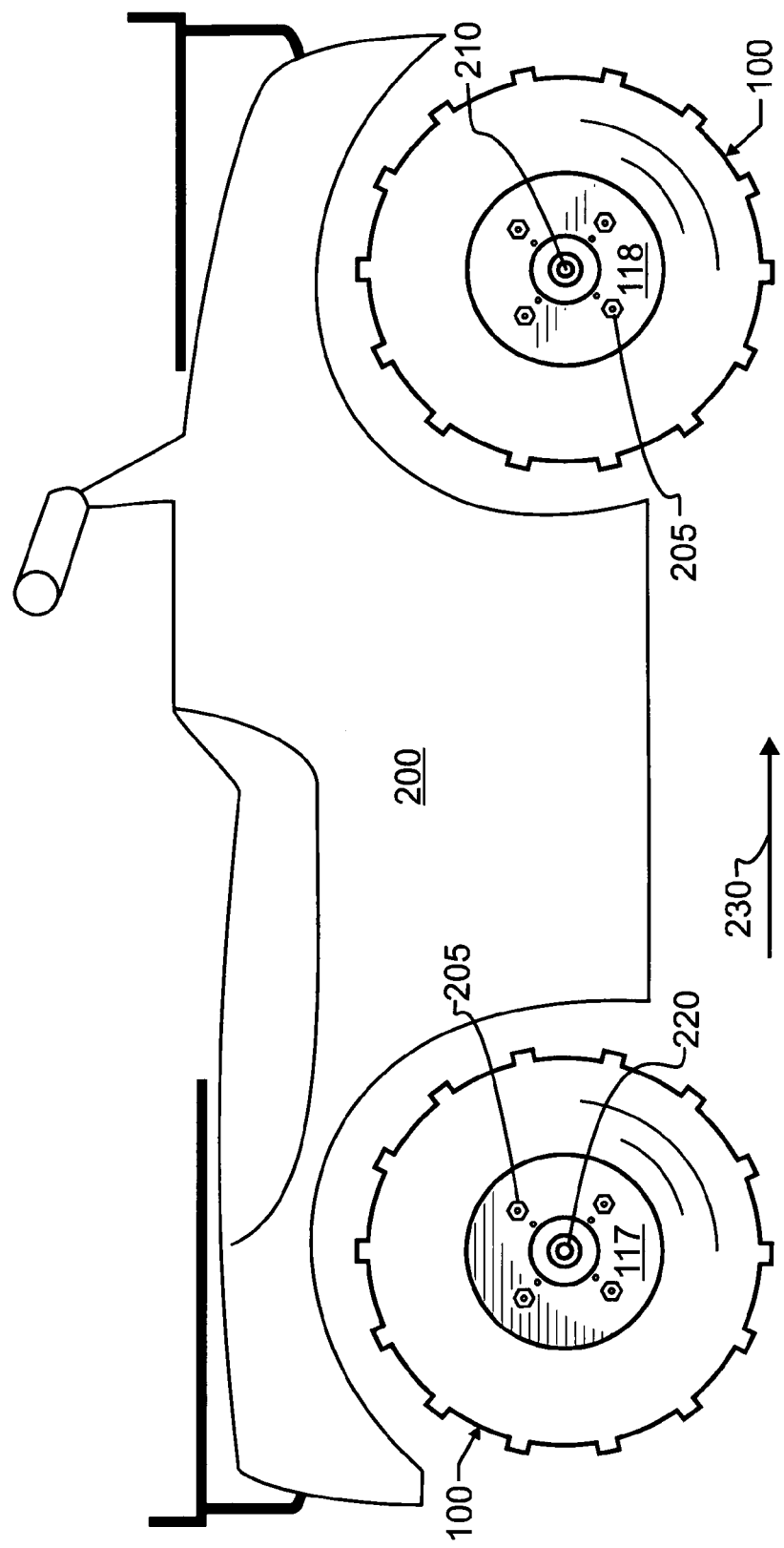
FIG. 4 illustrates the preferred embodiment wheel of FIG. 1 in further combination with a four-wheel All-Terrain Vehicle (ATV) from side plan view.

FIG. 4 illustrates a preferred combination of a plurality of trench wheels 100 and ATV 200 is also illustrated, which offers additional benefit and novelty beyond the novelty of preferred trench wheel 100. Nevertheless, it is noteworthy that the teachings of the present invention for exemplary purposes, but expressly not limited thereto, may be applied to other diverse motorized land vehicles, such as tractors, automobiles and pick-up trucks, wagons, trailers, sprayers and other devices. As is best visible from FIG. 3, an opposite side of the hub section 110 from central hole 114 has a larger opening that is recessed towards the center of the wheel. Consequently, the mounting points along center 110 which will be in secured contact with a wheel hub 210, 220 are offset from an axis 230 that runs parallel to the direction of travel and centered in the region of ground contact along the outer diameter of wheel 100. The resultant trench wheel 100 is identical in construction and geometry in the present figures, whether mounted to the front or rear of ATV 200. By selecting appropriate dimensions and hub accommodating features, which will be more apparent in consideration of the figures, the present inventor has discovered that a single wheel will accommodates a very large number of the existing ATV hub constructions without alteration, including both front and rear axle positioning. This ability to reverse the inside and outside faces of the wheel during mounting is enabled by the present invention. By providing a single wheel geometry which will accommodate both front and rear wheels of a variety of different models, larger volumes of production are attainable, stock inventories may be much lower, and resultant costs are lower.

A total of eight lug holes 112 are illustrated, together with four more central holes 11 and four cut-outs 109, as is a central hub opening 114. While few if any commercial ATVs will use all holes 111, 112, and cut-outs 109, this arrangement offers nearly universal accommodation of differing lug patterns. In the most preferred embodiment, there is an approximately twenty-two degree offset between cut-outs 109 and holes 111, which permits lugs 205 passing through holes 412 and 512, discussed herein below, to exit without interference with central hub opening 114. The offset is necessary to ensure adequate material to obtain the desired strength adjacent holes 111. The wheel center 110, in the most preferred embodiment, is three inches across, from surface 118 to outer wheel surface 120. This dimension has been determined to be important to the proper fitting of all ATV wheels. FIG. 4 additionally reveals the rear axle attachment to the preferred embodiment trench wheel, with the rear axle taking a geometry adjacent the trench wheel generally resembling a plus sign.

Figure 5:
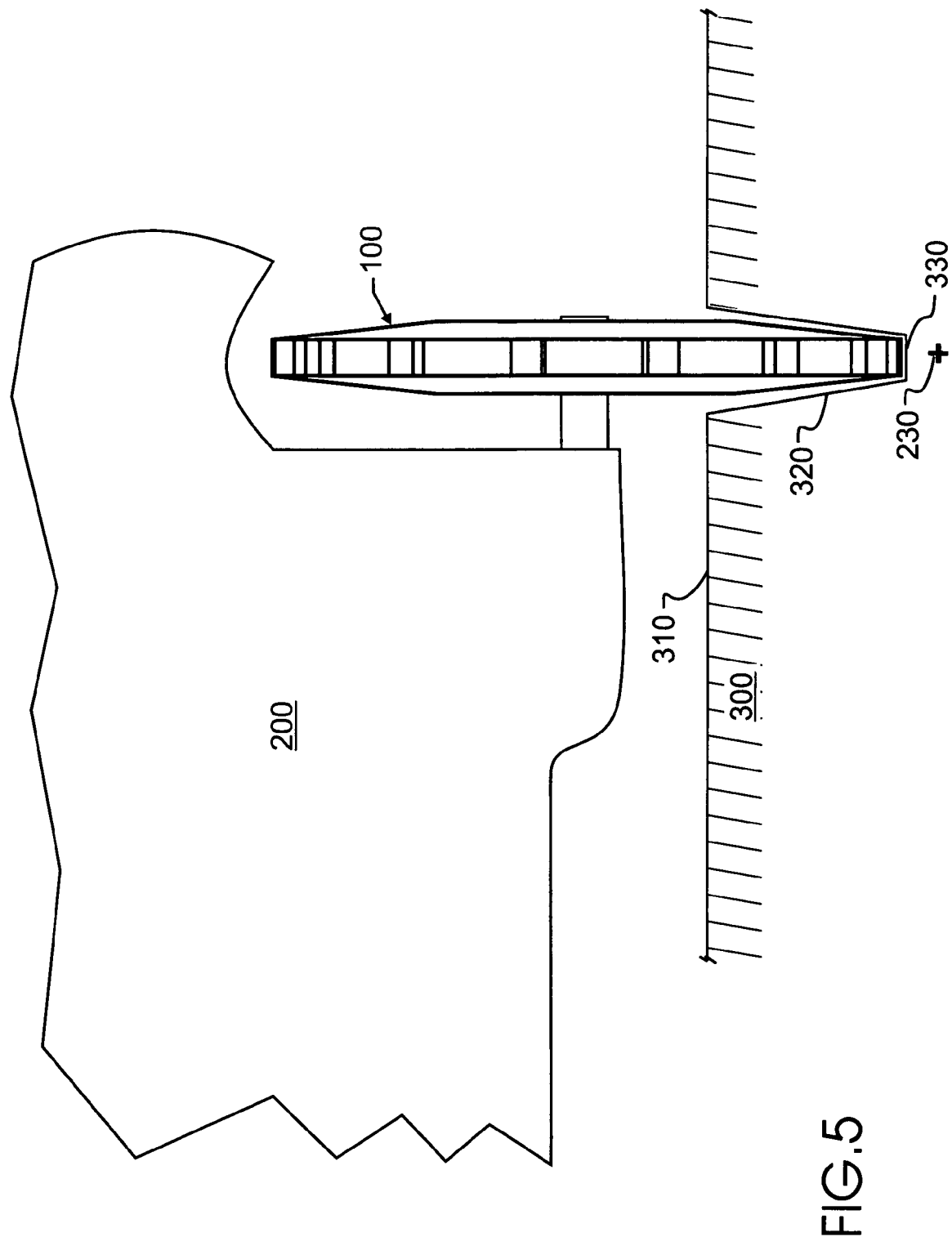
FIG. 5 illustrates the implementation of a preferred method for agricultural treatment in accord with the teachings of the present invention from partial plan view.

FIG. 5 illustrates a preferred method for agricultural treatment in association with the preferred embodiment trench wheels. Earth 300, which may represent a typical field which may be either dry, partially flooded, or flooded, is traversed by the most preferred combination trench wheel 100 and ATV 200. Flooding, which may be the result of normal spring thaw, excessive rains, poor field soil conditions and inadequate drainage, or any other multitude of causes, would potentially render some portion of the field unsuitable for planting or growth. Even when common machinery is able to traverse this flooded area without getting stuck or damaged, the seed will all too frequently rot in the water and not germinate property. Where the crop has already been planted, the moisture may drown the root system and kill the crop. Consequently, some method of drainage is highly desirable in order to make the best use of the land area. This drainage is achieved in the preferred embodiment method by driving the most preferred combination trench wheel 100 and ATV 200 from an edge of the field such as a lowland, stream or other natural drainage area herein referred to as a water sink onto the field, whereby the field may drain. During such method, trench wheel 100 may travel through earth 300 with center 100 only slightly above earth 300. At this depth, drainage channels 320 having bottoms 330 of maximum depth are formed in earth 300. As aforementioned, the speed of ATV 200, soil condition, and total load carried upon or within trench wheel 100 each affect the depth of channels formed. As also contemplated herein, a driver of ATV 200 may make more than one pass through the same tracks, which may also add to the total depth somewhat. There is, however, no requirement to follow the same trenches, and one or more additional trenches may be formed. In the preferred embodiment, a regular pattern of channels may be formed to more consistently control moisture throughout the field.

Rather than attempting to drain a field, moisture present in the field may be intentionally directed to and channeled with trenches 320. This moisture acts as a small reservoir which both temporarily stores liquid and also helps to infuse the adjacent soil with higher levels of water. Water within these trenches 320 is somewhat less prone to evaporate than a shallower body with more surface area, and so the very beneficial higher soil moisture levels are maintained. While a plurality of trenches may be used between crop rows, there will still be very little land area consumed, owing to the narrow nature of trench wheel 100. Most preferably, for irrigation purposes the trenches will be sufficiently close to the crops that the channels will act as a source of moisture to the crops.

In addition to drainage, trenches formed in association with the teachings of the present invention will also have utility in the control of erosion, and in the temporary marking of land. The lower trench bottoms 330 will collect run-off from the surface of the earth 300, while trapping eroded soil therein. Unlike larger prior art trenches which are dug using massive and expensive equipment and which consume large field surface area, the present trenches may be formed using low cost and readily available equipment, and with very little time and land area. The resultant trenches are not mounded significantly, and so do not form obstacles to the subsequent passage of other farm machinery or vehicles. Likewise, the present trenches may be used to serve as temporary landmarks beyond ordinary chalking or the like. Noteworthy here is the fact that during the harvesting of some crop, plant matter will be distributed across the surface of the land. Ordinary chalking will not be visible, while the present trenches will still show.

Trench wheel 100 in this most preferred embodiment of the invention changes from a thickness of approximately one inch at the outer diameter to approximately three inches adjacent wheel center 110. While this convex configuration inherently provides a desirable v-shaped trough for drainage and the like, an additional benefit is also realized. During travel through soft, wet or other difficult terrain, the v-shape causes a spreading of the earth. This spreading tends to apply a force lifting ATV 200 upward against the force of gravity. Consequently, not only does the weight of ATV 200 control the depth of trenches formed using the preferred combination ATV and trench wheels, but the velocity of travel also controls this depth. In one conceived variation, the exact geometry of trench wheel 100 may be modified to provide desired depth-to-velocity profiles for a given vehicle or load simply by changing the hub to circumference shape curvature.

Figure 7:
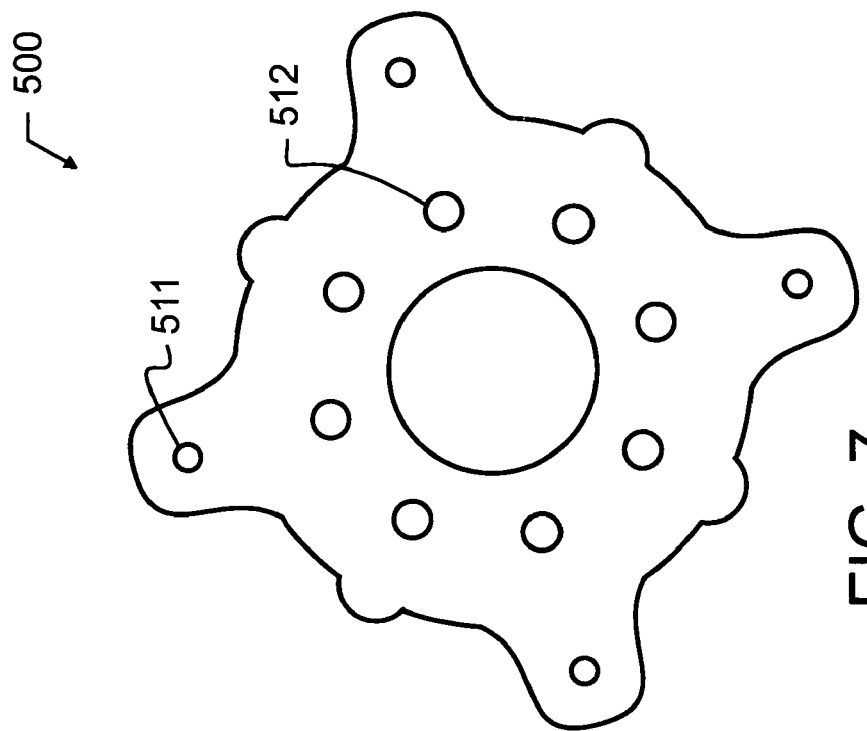
FIG. 7 illustrates a second preferred embodiment adapter plate used with the preferred embodiment wheel of FIG. 1 in accord with the teachings of the present invention.
Figure 6:
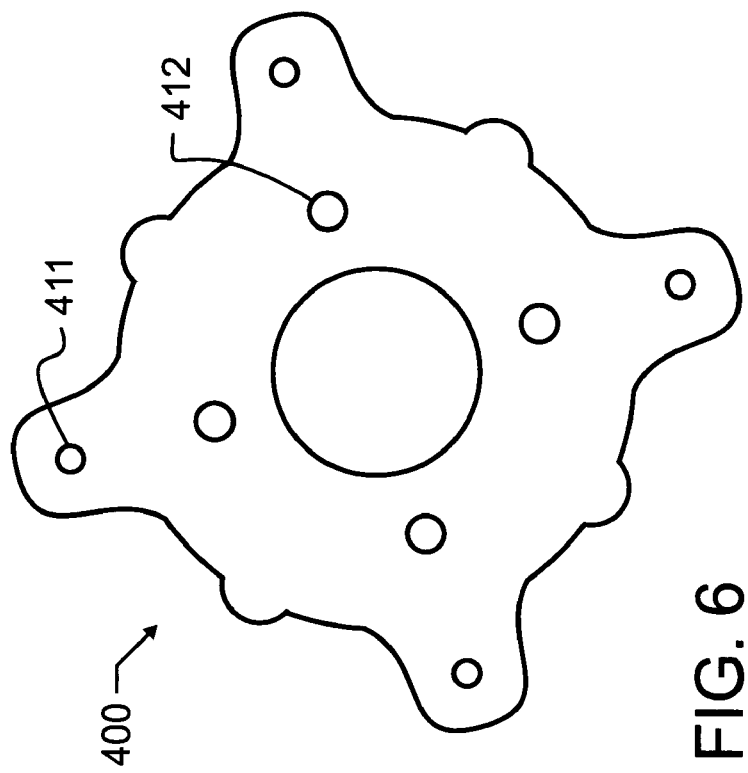
FIG. 6 illustrates a first preferred embodiment adapter plate used with the preferred embodiment wheel of FIG. 1 in accord with the teachings of the present invention.

FIGS. 6 and 7 illustrate two preferred hub adapters 400 and 500. These adapters permit the single wheel design illustrated herein, when used in association with appropriate adapter, to fit all major ATV designs currently in production. Each adapter includes outer holes 41, 511 which are designed to align with wheel center holes 112. Additional holes 412, 512 are provide for cooperative engagement with the stud pattern found on the particular ATV 200.

Figure 2:
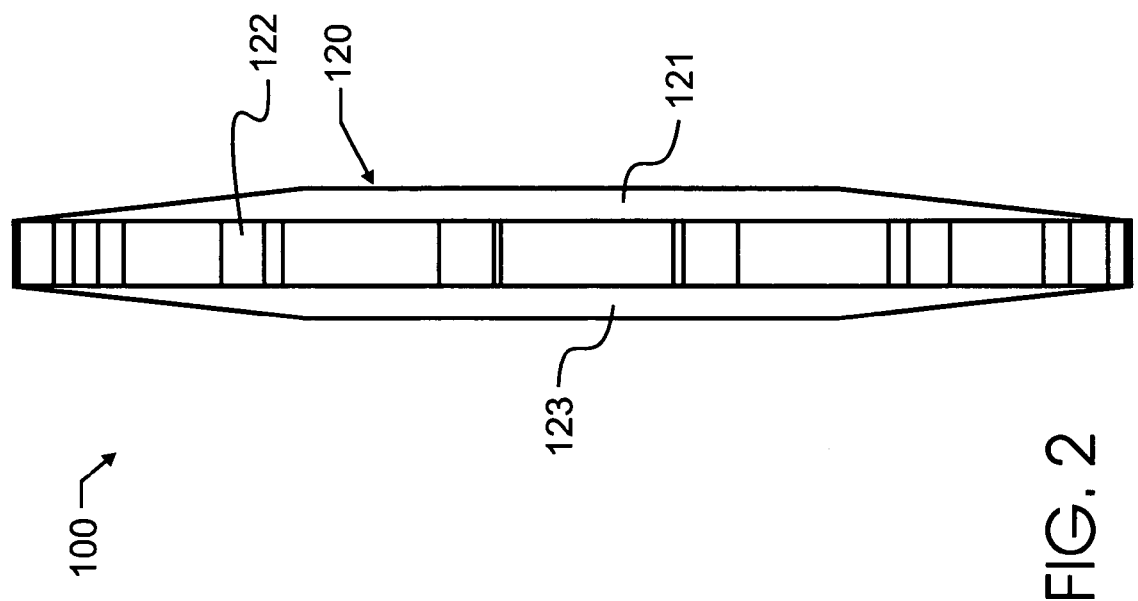
FIG. 2 illustrates the preferred embodiment wheel of FIG. 1 from front plan view.
Figure 8:
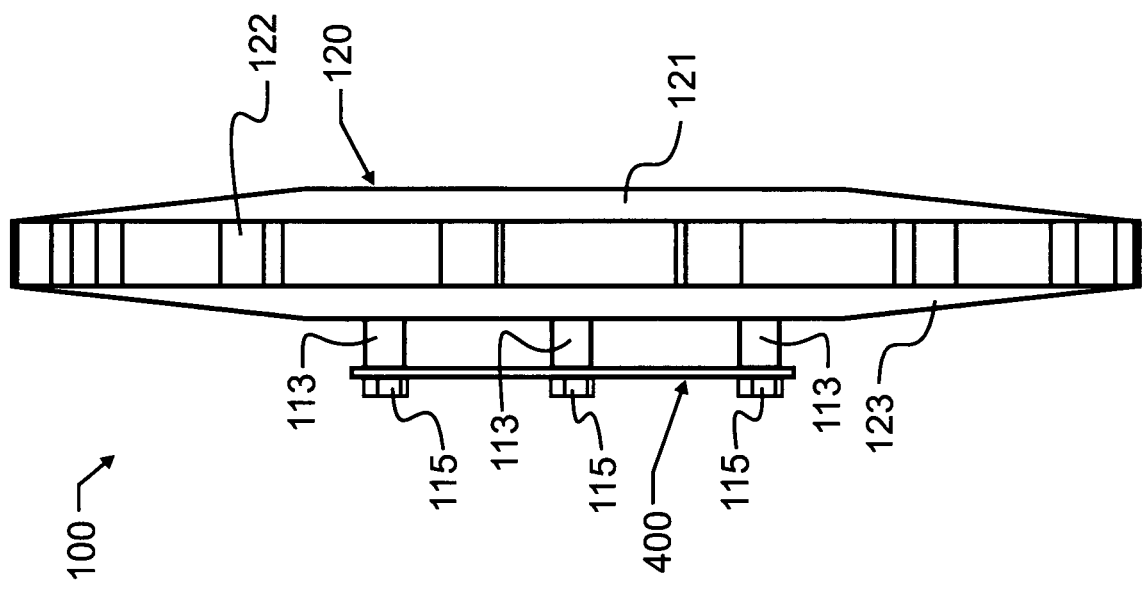
FIG. 8 illustrates the attachment of a preferred adapter plate to preferred embodiment wheel from front plan view.

FIG. 8 illustrates the attachment of adapter 400 from front view similar to FIG. 2, showing the use of spacers 113 and bolts 115. The view of the attachment of adapter 500 would be identical. In at least one model, spacers 113 are necessary to obtain the desired full wheel center width necessary to provide axial alignment between front and rear axles. In addition, spacers 113 and adapters 400, 500 permit the wheels to be offset from factory centers, to accommodate row spacings of crops. The dimension of spacers 113 may be selected accordingly.

While using preferred embodiment trench wheel 100 having elastomeric outer wheel 120 permits travel over nearly any surface, the preferred combination ATV 200 and trench wheel 100 may optionally be transported upon trailer or other land vehicle using standard prior art ramps, allowing the preferred apparatus to be rapidly delivered to a location for application. Other contemplated method steps include the traversing of a dry field, since the narrow-faced wheels produce minimal crop disturbance. The present invention trenches are also readily removed with conventional tillage machinery, if so desired. In yet further application, the present trench wheels are well-suited for mud racing and traveling in areas where ordinary vehicle pneumatic wheels may be prone to being punctured or otherwise disabled, and for various military exercises. Consequently, the present invention has broad application beyond the most preferred methods described herein.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. In combination, a land vehicle and at least two trench wheels;

said land vehicle having at least two wheel hubs for supporting said at least two trench wheels in axial alignment along an axis of forward travel, a first one and a second one of said at least two wheel hubs displaced from alignment with each other and aligned about an axis nonparallel to said axis of forward travel, said first one of said at least two wheel hubs supporting a first one of said at least two trench wheels and said second one of said at least two wheel hubs supporting a second one of said at least two trench wheels;

said at least two trench wheels having identical construction to the other, each having a wheel axis of rotation, first and second side walls separated from each other by a distance which generally decreases with increasing radial distance from said wheel axis of rotation, and each also having a mounting offset from said axis of forward travel which has a first mounting face and a second mounting face opposed to said first mounting face;

said first one of said at least two trench wheels mounted to said first one of said at least two wheel hubs with said first mounting face adjacent said first one of said at least two wheel hubs, said second one of said at least two trench wheels mounted to said second one of said at least two wheel hubs with said second mounting face adjacent said second one of said at least two wheel hubs.

2. The combination land vehicle and trench wheel of claim 1 wherein said land vehicle is a four-wheeled ATV and said at least two wheel hubs comprise both front and rear wheel ATV wheel mounts.

3. The combination land vehicle and trench wheel of claim 2 wherein said at least two trench wheels are shaped to cut trenches in mud or soft soil when used as replacements for at least two inflatable tires of said ATV, thus allowing sub-surface conduction of water.

4. The combination land vehicle and trench wheel of claim 1 wherein said at least two trench wheels further comprise:
   an outer generally circumferential region of ground contact;
   a hub section generally radially centered with respect to said outer generally circumferential region; and
   an outer wheel having first and second side walls spaced from each other.

5. The combination land vehicle and trench wheel of claim 4 wherein said outer wheel is elastomeric.

6. In combination, a land vehicle and at least two trench wheels;
   said land vehicle having at least two wheel hubs for supporting said at least two trench wheels in axial alignment along an axis of forward travel, a first one and a second one of said at least two wheel hubs aligned about an axis nonparallel to said axis of forward travel, said first one of said at least two wheel hubs supporting a first one of said at least two trench wheels and said second one of said at least two wheel hubs supporting a second one of said at least two trench wheels;

said at least two trench wheels having identical construction to the other, each being relatively narrower at an outer circumference and widening with decreasing radius, and each also having a mounting offset from said axis of forward travel which has a first mounting face and a second mounting face opposed to said first mounting face;

said first one of said at least two trench wheels mounted to said first one of said at least two wheel hubs with said first mounting face adjacent said first one of said at least two wheel hubs, said second one of said at least two trench wheels mounted to said second one of said at least two wheel hubs with said second mounting face adjacent said second one of said at least two wheel hubs.

7. The combination land vehicle and trench wheel of claim 6 wherein said land vehicle is a four-wheeled ATV and said at least two wheel hubs comprise both front and rear wheel ATV wheel mounts.

8. The combination land vehicle and trench wheel of claim 7 wherein said at least two trench wheels are shaped to cut trenches in mud or soft soil when used as replacements for at least two inflatable tires of said ATV, thus allowing sub-surface conduction of water.

9. The combination land vehicle and trench wheel of claim 6 wherein said at least two trench wheels further comprise:
   an outer generally circumferential region of ground contact;
   a hub section generally radially centered with respect to said outer generally circumferential region; and
   an outer wheel having first and second side walls spaced from each other.

10. The combination land vehicle and trench wheel of claim 9 wherein said outer wheel is elastomeric.

* * * * *